US012786181B2

(12) United States Patent
Guilford et al.

(10) Patent No.: US 12,786,181 B2
(45) Date of Patent: Nov. 3, 2026

(54) AUTHENTICATOR COMMUNICATING WITH A CLIENT COMPUTER TO AUTHENTICATE ACCESS TO A SERVER

(71) Applicant: INTERNATIONAL BUSINESS MACHINES CORPORATION, Armonk, NY (US)

(72) Inventors: Michael Guilford, Cary, NC (US); Benjamin William Shade, Waterlooville (GB); Adam J. Oakey, Fareham (GB); Scott Moonen, Fuquay Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 18/406,081

(22) Filed: Jan. 5, 2024

(65) Prior Publication Data

US 2025/0227102 A1 Jul. 10, 2025

(51) Int. Cl.
*H04L 9/40* (2022.01)
*H04L 61/4511* (2022.01)

(52) U.S. Cl.
CPC ...... *H04L 63/0823* (2013.01); *H04L 61/4511* (2022.05); *H04L 63/0236* (2013.01)

(58) Field of Classification Search
CPC ............. H04L 63/0236; H04L 63/0823; H04L 61/4511
See application file for complete search history.

(56) References Cited

U.S. PATENT DOCUMENTS 7,143,136 B1 * 11/2006 Drenan .................. G06Q 10/06 709/204
8,526,405 B2 * 9/2013 Curtis ..................... H04L 67/02 370/339
9,148,408 B1 * 9/2015 Glazemakers .......... H04L 63/20
(Continued)

FOREIGN PATENT DOCUMENTS

IN 201921017918 A 5/2019

OTHER PUBLICATIONS

"Guide to a Secure Enterprise Network Landscape," National Institute of Standards and Technology, NIST Special Publication (SP) 800-215, Nov. 2022, 40 pp.
(Continued)

*Primary Examiner* — Dhairya A Patel
(74) *Attorney, Agent, or Firm* — Seed Intellectual Property Law Group LLP

(57) ABSTRACT

Provided are a computer program product, system, and method for an authenticator to communicate with a client computer to authenticate access to a server. Authentication parameters are received to authenticate the client computer with the server, wherein the authentication parameters are for a domain name record for the server. The authentication parameters from the client computer are used to authenticate the client computer to access the server. A plurality of network addresses are received and used to identify the client computer in the network. In response to authenticating the client computer, the plurality of network addresses used to identify the client computer are forwarded to an access list for the server to allow the client computer to access the server. A message is sent to the client computer indicating access to the server allowed.

20 Claims, 5 Drawing Sheets

(56) References Cited

U.S. PATENT DOCUMENTS

| | | | | |
|---|---|---|---|---|
| 10,666,613 | B2 | 5/2020 | Knecht et al. | |
| 10,944,714 | B1 * | 3/2021 | Cosma | H04L 61/10 |
| 10,986,171 | B2 * | 4/2021 | Peng | H04L 41/0823 |
| 11,190,397 | B2 * | 11/2021 | Cathrow | H04L 61/4511 |
| 11,316,825 | B2 | 4/2022 | Knecht et al. | |
| 11,509,629 | B2 | 11/2022 | Teo et al. | |
| 12,137,026 | B1 * | 11/2024 | Cathrow | H04L 41/0806 |
| 2012/0173565 | A1 * | 7/2012 | Jacobs | G06F 16/951<br>707/769 |
| 2016/0020905 | A1 * | 1/2016 | Poole | G06F 21/6227<br>713/184 |
| 2017/0012780 | A1 * | 1/2017 | Kaliski, Jr. | H04L 61/4511 |
| 2019/0288982 | A1 * | 9/2019 | Li | H04L 61/2557 |
| 2021/0067377 | A1 * | 3/2021 | Beck | H04L 9/14 |
| 2022/0246135 | A1 * | 8/2022 | Kinoshita | G06F 16/436 |
| 2022/0417035 | A1 * | 12/2022 | Guilford | H04L 63/10 |
| 2022/0417310 | A1 * | 12/2022 | Thaw | G06F 16/9574 |
| 2023/0319337 | A1 * | 10/2023 | Yamada | G06Q 10/02<br>725/75 |
| 2024/0004973 | A1 * | 1/2024 | Bosch | G06F 21/31 |
| 2025/0184320 | A1 * | 6/2025 | Iwamoto | H04L 63/0823 |
| 2026/0143427 | A1 * | 5/2026 | Li | H04W 52/0235 |

OTHER PUBLICATIONS

M. Graham, et al., "Domain Name System Enhanced Network Address Translation," IP.com, IP.com No. IPCOM000252422D, Jan. 9, 2018, 8 pp.

"Encryption of IP Addresses Using DNS for Obscuring Hosts in the Prevention of DDOS Attacks," IP.com, IP.com No. IPCOM000269804D, May 12, 2022, 3 pp.

"AI Threat Containment System Using Machine Learning," IP.com, IP.com No. IPCOM000272292D, May 27, 2023, 8 pp.

"Authentication and Integrated User Firewalls User Guide," Juniper Networks, Inc., Sep. 14, 2023, 947 pp.

R. Chandramouli, et al., "Secure Domain Name System (DNS) Deployment Guide," National Institute of Standards and Technology, NIST Special Publication 800-81-2, Sep. 2013, 130 pp.

"Cybersecurity Made Simple—Sophos XG Firewall," Sophos, Nov. 5, 2021, 646 pp.

* cited by examiner

AUTHENTICATOR COMMUNICATING WITH A CLIENT COMPUTER TO AUTHENTICATE ACCESS TO A SERVER

BACKGROUND OF THE INVENTION

1. Field of the Invention

The present invention relates to a computer program product, system, and method for an authenticator to communicate with a client computer to authenticate access to a server.

2. Description of the Related Art

Servers connected to a network, such as the Internet, are vulnerable to attacks from remote users. If a server is vulnerable to attack or a request to the server contains malicious payload, then the server can be compromised leading to any number of security issues. Some web servers provide an authentication mechanism, for example a login to a web page, before further access to the server resources is permitted. This login can be part of the web server or application mechanism or within a web page or application.

Firewalls can also protect a server from malicious users. If the sources of a request are known, such as on an allow list, then the firewall may allow the requests while blocking connections from sources not indicted on the allow list. Another option is to block requests from Internet Protocol (IP) addresses associated with a geographic region. Another existing firewall solution is known as "captive portal". In this instance, the firewall authenticates the request before the connection is established and the request is forwarded to the server.

SUMMARY

Provided are a computer program product, system, and method for an authenticator to communicate with a client computer to authenticate access to a server. Authentication parameters are received to authenticate the client computer with the server, wherein the authentication parameters are for a domain name record for the server. The authentication parameters from the client computer are used to authenticate the client computer to access the server. A plurality of network addresses are received and used to identify the client computer in the network. In response to authenticating the client computer, the plurality of network addresses used to identify the client computer are forwarded to an access list for the server to allow the client computer to access the server. A message is sent to the client computer indicating access to the server allowed.

DETAILED DESCRIPTION

Figure 1:
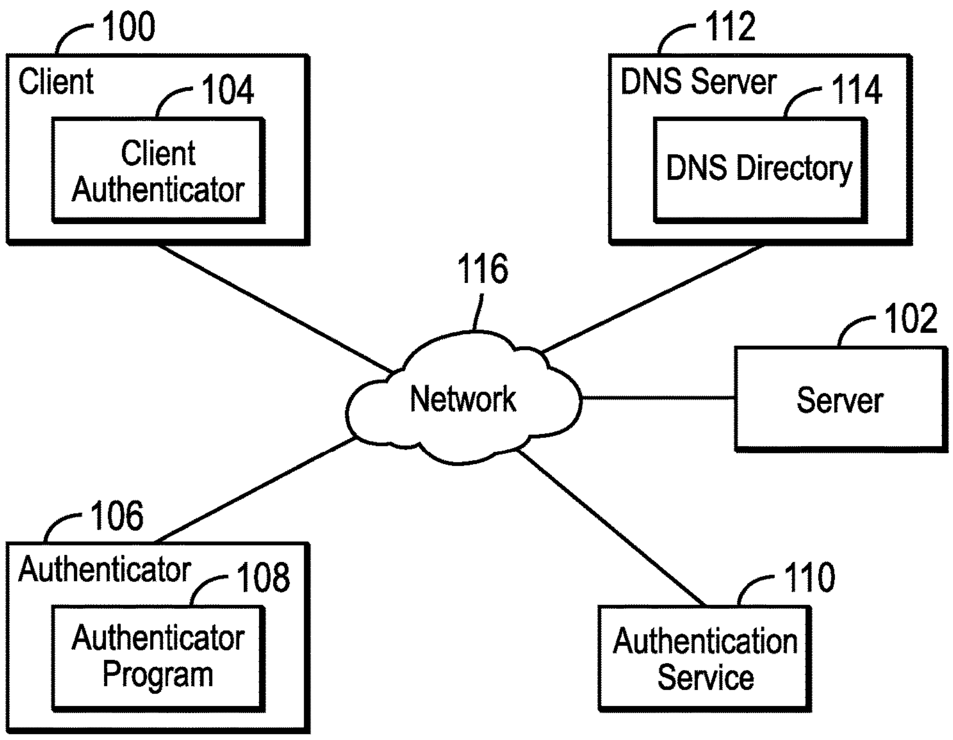
FIG. 1 illustrates an embodiment of a network computing environment.

Current techniques for authenticating a client before the client can connect to a server have various flaws. Solutions that use an authentication mechanism to login at the server still expose the server to communications from malicious clients as part of the login process. Firewall techniques, such as captive portal, have constraints, including that the controls are implemented in the infrastructure and not in the server, which means the authentication infrastructure/firewall needs to be in a location where the server resides. In a multi-cloud world, fixed firewall infrastructure does not scale well and the firewall may not be portable if the infrastructure is moved, leaving the server exposed. Further, using firewall infrastructure for authentication relies on enterprise focused infrastructure teams to implement and the authentication is from a Lightweight Directory Access Protocol (LDAP) or enterprise directory, rather than a global identity provider (IDP).

Described embodiments provide improvements to authentication computer technology to address the above constraints of current firewall technology by having an authenticator, separate from the infrastructure controlling access, use information related to a DNS text record, which the client receives when requesting the DNS record when accessing the server, to authenticate the client and automatically update firewall access when the authentication succeeds.

In described embodiments, software on the client computer, such as a plug-in application or an installed application, retrieves the DNS record, including authentication parameters for authenticating through an authentication system. The client sends authentication parameters and a plurality of network addresses used by the client to the authenticator to authenticate the client. The authenticator upon authenticating the client, will update the firewall or proxy rules with all the network addressed provided by the client to allow client access to the server using any of the plurality of network addresses. The authenticator communicates with both the client and firewall and will make the necessary communications to complete the authentication and accept and send information needed to update the firewall.

Described embodiments add authentication capabilities to various network computing environments, including on-premises, cloud, hybrid cloud, and multi-cloud, to enable access to resources over different networks, with portability that follows resources from one cloud to another providing consistent access to resources from anywhere. Described embodiments provide security and identity and Secure Access Service Edge (SASE) capabilities by preventing access until an out-of-band authentication at the authenticator has occurred to protect the server resources from online security threats. Described embodiments render computing resources invisible and unavailable (e.g., ports, workloads, and applications) and only expose the resource after the user is authenticated and authorized.

FIG. 1 illustrates an embodiment of a network computing environment including a client 100 that wants to access a server 102. The client 100 includes a client authenticator 104 to interface with an authenticator 106 to authenticate the client 100 to access the server 102. The authenticator 106 includes an authenticator program 108 to authenticate the client 100 with an authenticator service 110 which verifies whether the client presented credentials or access information identifying the client 100 is permitted to access the server 102. The client 100 communicates with a Domain Name Service (DNS) server 112 to lookup domain names in a DNS directory 114 and return a network address, e.g., Internet Protocol (IP) address, to the client 100 submitting a DNS request. The DNS server 112 further returns a DNS record 200 with the domain name network address. The client 100, server 102, authenticator 106, authentication service 110, and DNS server 112 communicate over a network 116.

The program components of FIG. 1, including components 104 and 108, may comprise program code loaded into a memory and executed by one or more processors. Alternatively, some or all functions may be implemented as microcode or firmware in hardware devices, such as in Application Specific Integrated Circuits (ASICs).

The network 116 may comprise a Storage Area Network (SAN), a Local Area Network (LAN), a Wide Area Network (WAN), the Internet, and Intranet, peer-to-peer network, direct communication paths, etc.

Figure 2:
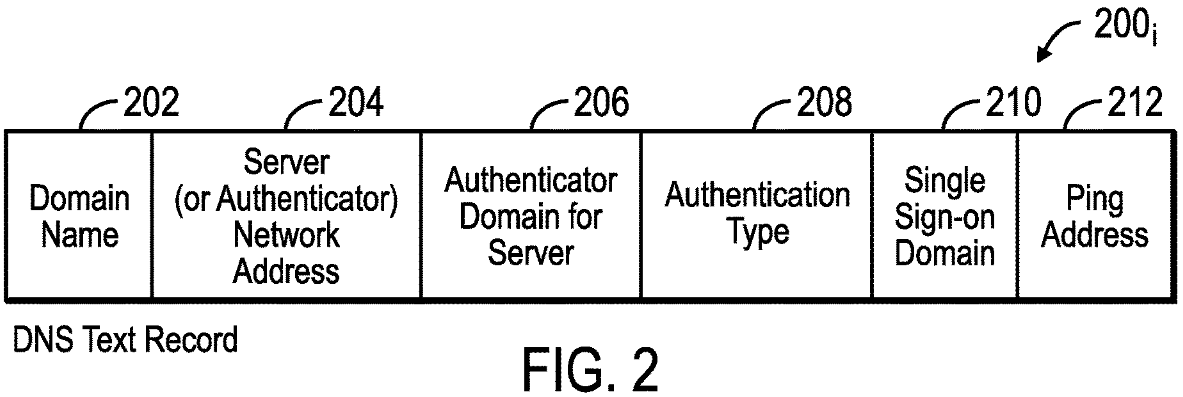
FIG. 2 illustrates an embodiment of a Domain Name Service (DNS) text record.

FIG. 2 illustrates an embodiment of a DNS text record 200 provided from the DNS directory 114, including a domain name 202 for which the record 200 is provided 3; a server (or authenticator) network address 204; an authenticator domain name 206 for the server for which authentication is sought; and authentication parameters, including an authentication type 208, such as client certificate, passwords, etc.; single sign-on domain 210 comprising the domain name of the authenticator 106 at which to authenticate the client 100; and a ping address 212 comprising a Universal Resource Locator (URL) address, e.g., whatsmyip.com, to which the client 100 issues a GET request to obtain a translated network (IP) address for the client 100, such as an address the server 102 would provide the client 100 to use to route traffic to a geographical location to exit the server 102 domain.

Figure 3:
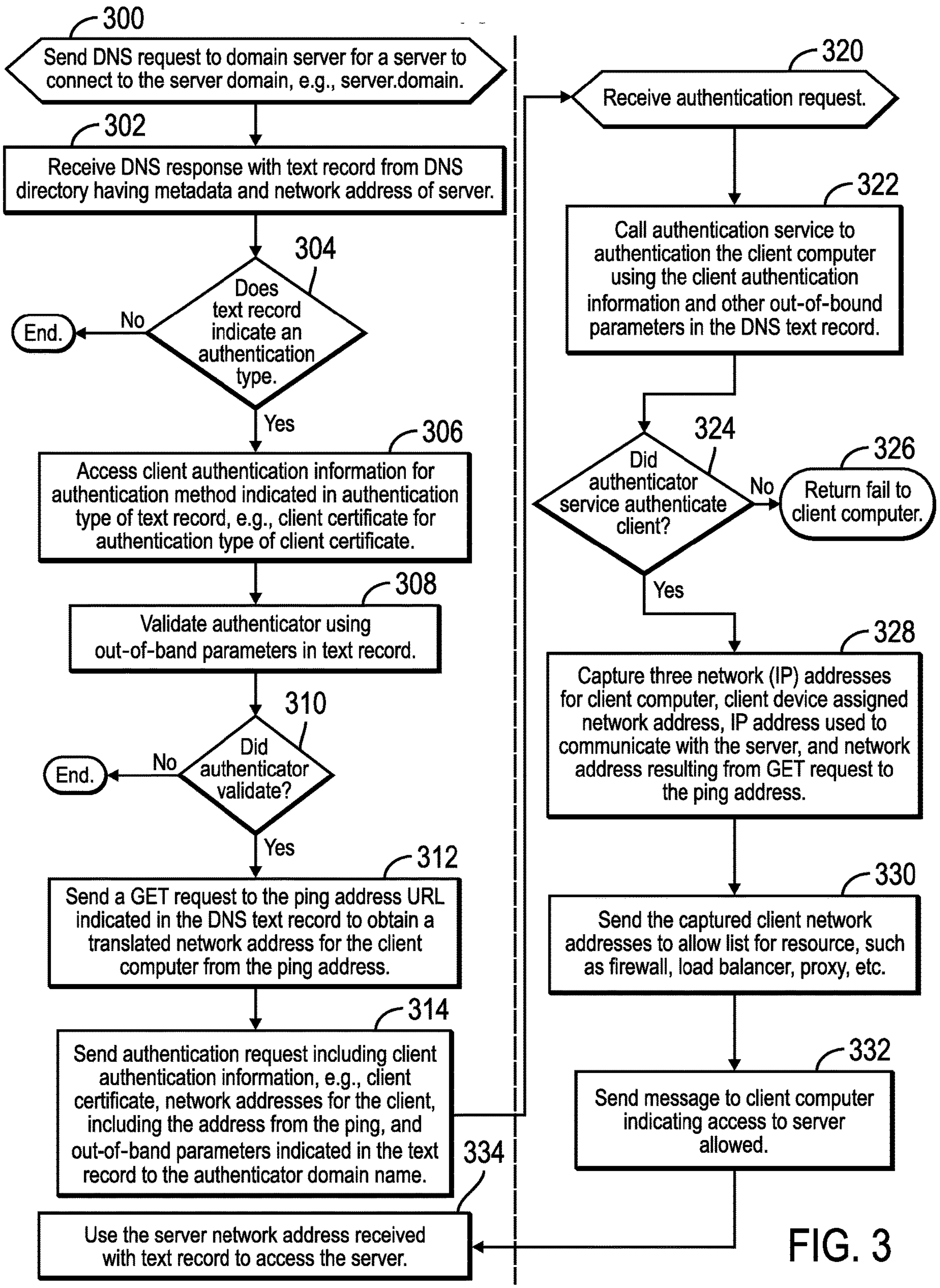
FIG. 3 illustrates an embodiment of operations to authenticate a client computer to access server through an authenticator.

FIG. 3 illustrates an embodiment of operations among the components of FIG. 1, including the client 100, server 102, authenticator 106, authentication service 110, and DNS server 112 to authenticate the client 100 to access the server 102. To initiate authentication, the client authenticator 104 sends (at block 300) a DNS request to the DNS server 112 to connect to the server domain, e.g., server.domain. The client authenticator 104 receives (at block 302) a DNS response including a DNS text record 200 from the DNS directory 114 having authentication parameters 208, 210, and 212 and a network address of the server, e.g., 10.1.1.1. The client authenticator 104 determines (at block 304) whether the authentication parameters in the text record 200 indicate an authenticator domain name 206 and authentication type 208 providing for authentication. If not, control ends. If (at block 304) an authentication type is indicated, then the client authenticator 104 accesses (at block 306) client authentication information for the authentication method indicated in authentication type 208 of the text record 200, e.g., client certificate for authentication type 208 indicating client certificate. The client authenticator 104 may gather other types of authentication information, such as username and password, for other authentication types.

The client authenticator 104 may validate (at block 308) the authenticator 106 using the out-of-band authentication parameters 208, 210, 212 from the DNS text record 200. If (at block 310) the authenticator 106 is not validated, then control ends with failing the client authentication. If (at block 310) the authenticator 106 is validated, then the client authenticator 104 sends (at block 312) a GET request to the ping address 212, e.g., a URL, indicated in field 212 of the DNS text record 200, to obtain a translated network address for the client computer 100, which may comprise the network address the client 100 would expect when connecting to the server 102. The network address from the ping address 212 may be different than the network address used to communicate with the server 102, such as a network address to route the client 100 communications to another location to exit the server 102 domain.

The client authenticator 104 sends (at block 314) an authentication request including client authentication information, e.g., client certificate, network addresses for the client, including the new address received from the GET request to the ping address 212, and out-of-band parameters indicated in the text record 200, to the authenticator domain name 206, e.g., "https://outofband.example.com/server.domain".

In response to receiving (at block 320) the authentication request from the client authenticator program 104, the authenticator program 108 calls (at block 322) the authentication service 110 to authentication the client computer 100 using the client authentication information and other out-of-bound parameters in the DNS text record 200. If (at block 324) the authentication service 110 did not authenticate the client 100, then control ends with fail returned (at block 326) to the client computer 100. Otherwise, if (at block 324) the client is authenticated, then the authenticator program 108 captures (at block 326) the three network (IP) addresses for the client computer 100, including a client device assigned network address, IP address used to communicate with the server 102, and network address resulting from the GET request to the ping address 212. The captured client network addresses are sent (at block 330) to an allow list for the server 102 resource, which may be in a firewall, load balancer, proxy, etc. for the server 102. The authenticator program 108 sends (at block 332) a message to the client computer 100 indicating access to the server 102 is allowed. The client computer 100 may then use (at block 334) the server network address, e.g., 100.1.1.1, received with the text record to access the server 102.

With the embodiment of FIG. 3, a client 100 is authenticated by sending information from a DNS text record 200 to an authenticator 106, which handles all the authentication via an out-of-band authentication procedure without requesting any further information from the client 100. The authenticator 106 may update a firewall or other allow list to allow the IP addresses used by the client 100 to access the server 102.

In the embodiment of FIG. 3, the server 102 address is returned to the client 100 in response to the DNS request. In an alternative embodiment, instead of the DNS server 112 returning the server 102 network address, e.g., 10.1.1.1, at block 302 in FIG. 3, the DNS server 112 may return the authenticator 106 network address, e.g., 200.2.2.2, at block 302 to conceal the server 102 network address until the client is authenticated. In such case, the authenticator 106 may return the server 102 address, e.g., 10.1.1.1, at block 332 in FIG. 3 when notifying the client 100 that the client 100 is authenticated to access the server 102.

Figure 4:
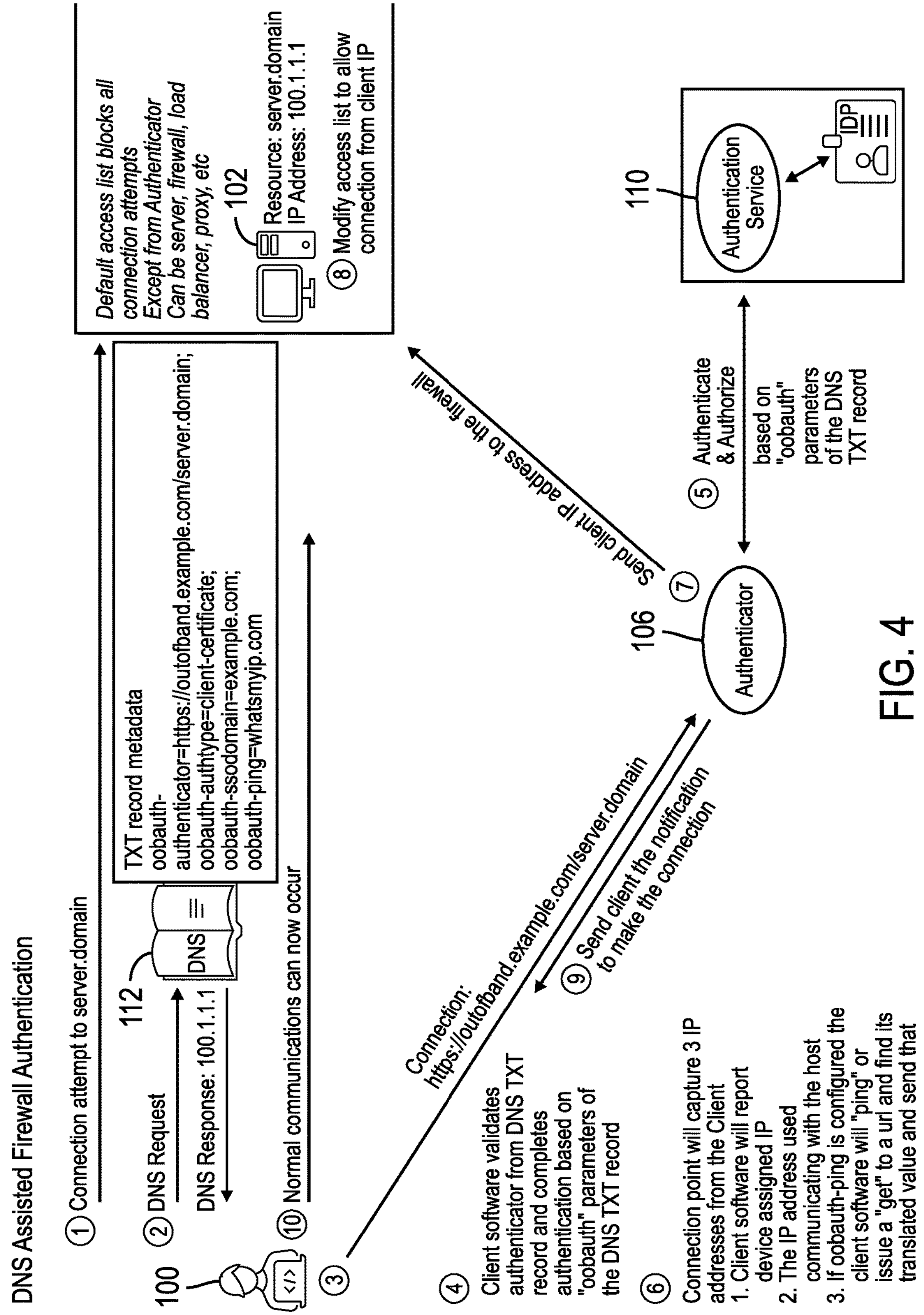
FIG. 4 illustrates a diagram of the flow of operations of the embodiment of FIG. 3.

FIG. 4 illustrates an embodiment of a flow diagram of the operations of FIG. 3. FIG. 4 shows the interaction of the components 100, 102, 106, 110, 112 and ordered flow of operations, numbered from 1-10, between these components to provide a DNS server 112 assisted firewall authentication. In the diagram, the text record 200 includes the following information, where "oobauth" refers to "out-of-band authentication":

oobauth-authenticator 206=https://outofband.example.com/server.domain;

oobauth-authtype 208=client-certificate;

oobauth-ssodomain 210=example.com;

oobauth-ping 212=whatsmyip.com.

Figure 5:
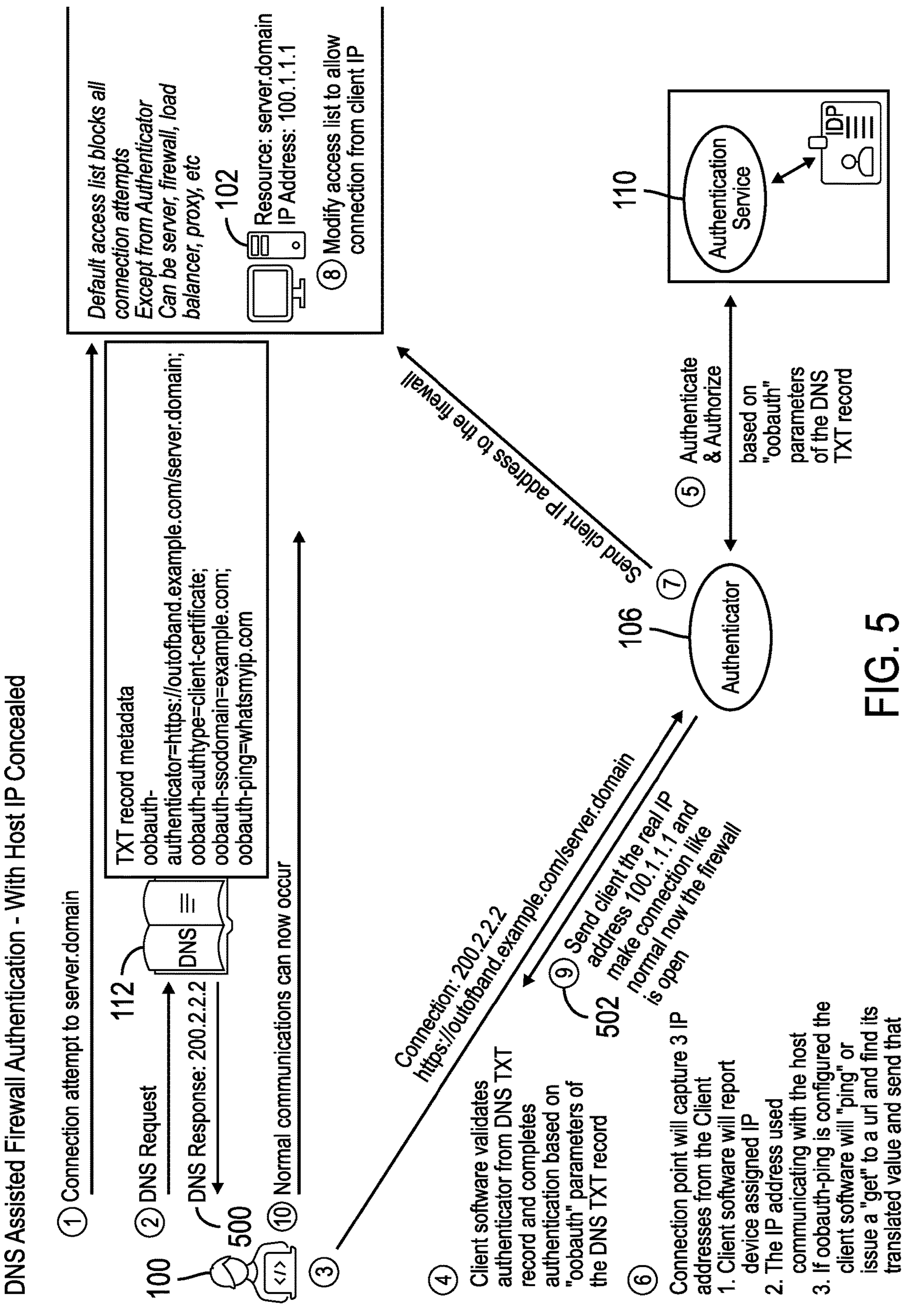
FIG. 5 illustrates an embodiment of a diagram of a flow of operations of an alternative embodiment of FIG. 3.

FIG. 5 illustrates a further embodiment of a flow diagram of an alternative embodiment of the operations of FIG. 3. FIG. 5 shows the interaction of the components 100, 102, 106, 110, 112 and an ordered flow of operations, numbered from 1-10, between these components when the network address of the server 102 is concealed until the client 100 is authenticated. FIG. 5 shows a DNS response 500 to the DNS request, numbered step 2, including the authenticator 106 network address, e.g., 200.2.2.2. The actual server 102 network address, e.g., 100.1.1.1, is not provided until sending the client the server 102 IP address 502, numbered step 9, after the client 100 is authenticated.

With the embodiment of FIGS. 4 and 5, the DNS response is used in conjunction with an authenticator 106 to have the authenticator 106 automatically update firewall or other proxy access to the server 102 without client involvement. Upon receiving the text record 200 with the authentication parameters, the client authenticator 104 will initiate the operations of FIG. 3, as shown in FIGS. 4 and 5, to authenticate before the connection can be completed. In one embodiment, if the client authenticator 104 determines the authenticator domain name 206 is present, e.g., "oobauth-authenticator=https://outofband.example.com/server.domain", then the client authenticator 104 is invoked to perform the operations of FIG. 3, shown in FIGS. 4 and 5.

Further provided are a computer program product, system, and method for a client computer to authenticate with a server. The client computer receives a text record in response to a request for a domain name record for the server. The text record includes a domain name of an authenticator and authentication parameters to use to authenticate with the authenticator. The client computer submits the authentication parameters to the authenticator using the domain name of the authenticator. The authenticator uses the authentication parameters to authenticate the client computer to access the server. The client computer provides the authenticator a plurality of network addresses used to identify the client computer in a network. In response to the authenticator authenticating the client computer, the client computer receives a message from the authenticator that the client computer is authenticated to communicate to the server. The client computer uses a network address of the server to communicate with the server.

In a further client computer embodiment, the text record received in response to the request for a domain name record comprises a domain name service (DNS) text record received from a DNS server.

In a further client computer embodiment, the response to the request for the domain name record for the server includes the network address of the server.

In a further client computer embodiment, the response to the request for the domain name record for the server includes a network address of the authenticator, wherein the network address and the domain name of the authenticator are used to communicate with the authenticator.

In a further client computer embodiment, the client computer receives, from the authenticator, the network address of the server in response to the authenticator authenticating the client computer.

In a further client computer embodiment, the plurality of network addresses used to identify the client computer comprise a first network address assigned by the client computer, a second network address assigned by an Internet Service Provider for the client computer, and a third network address provided to optimize communications with the server.

In a further client computer embodiment, the client computer communicates with the server through a firewall that is provided the plurality of network addresses used to identify the client computer in the network.

In a further client computer embodiment, the authentication parameters indicate an authentication type. The client computer transmits to the authenticator a certificate for the client computer the authenticator uses to authenticate the client computer in response to the authentication parameters indicating the authentication type.

In a further client computer embodiment, the authentication parameters received from the authenticator indicate a ping address. The client computer further performs sending a request to the ping address and receiving a response to the request to the ping address comprising a translated network address for the client computer to use for the server, wherein one of the plurality of network addresses provided to the authenticator include the translated network address.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
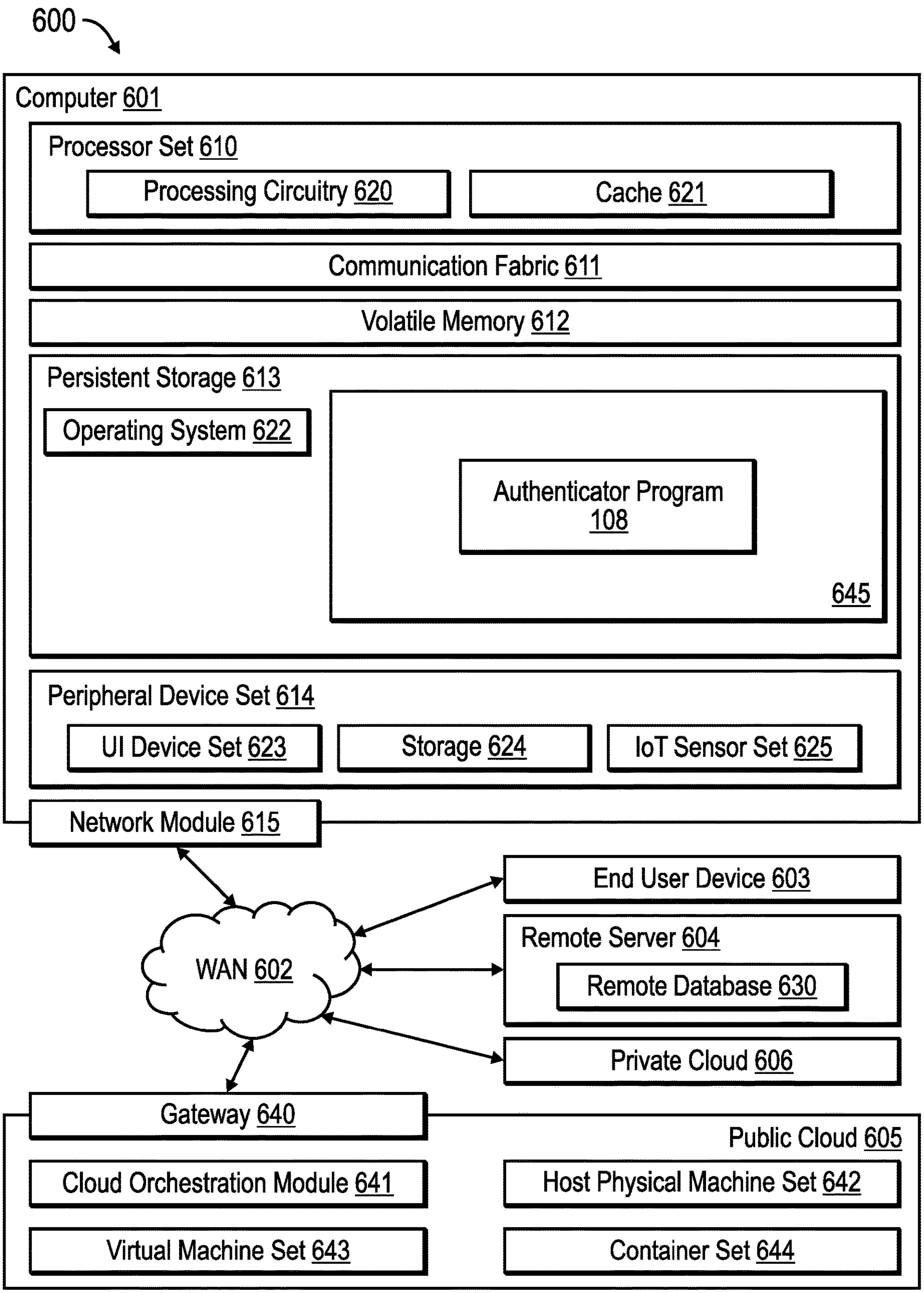
FIG. 6 illustrates a computing environment in which the components of FIG. 1 may be implemented.

With respect to FIG. 6, computing environment 600 contains an example of an environment for the execution of at least some of the computer code involved in performing the inventive methods, such as an authenticator program 108 in block 645, to use a DNS text record 200 to authenticate a client 100 to access a server 102. In addition to block 645, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 645, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer-readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 645 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open source Portable Operating System Interface-type operating systems that employ a kernel. The code included in block 645 typically includes at least some of the computer code involved in performing the inventive methods, including the authenticator program 108.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer-readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on. The EUD 603 may further comprise the client computer 100 including the client authenticator 104 as described with respect to FIG. 1.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604. The remote server 604 may comprise the authentication service 110 and server 102, as described with respect to FIG. 1.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602. The public cloud 605 may further include the DNS server 112.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

CLOUD COMPUTING SERVICES AND/OR MICROSERVICES (not separately shown in FIG. 6): private and public clouds 606 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for authenticating a client computer with a server over a network, the computer program product comprising a computer readable storage medium in an authenticator having computer readable program code embodied therein that when executed causes the authenticator to perform operations, the operations comprising:

receiving, from the client computer, an authentication request to authenticate the client computer with the server, wherein the authentication request includes out-of-band authentication parameters from a domain name text record for the server the client computer obtained from a domain server, including an authentication type indicating how the client computer is authenticated and a domain name of the authenticator to authenticate the client computer;

using the out-of-band authentication parameters to authenticate the client computer with an authentication service to access the server;

receiving a plurality of network addresses used to identify the client computer in the network;

in response to authenticating the client computer from the out-of-band authentication parameters, forwarding the plurality of network addresses used to identify the client computer to indicate in an access list for the server to allow the client computer to access the server; and send a message to the client computer indicating access to the server is allowed.

2. The computer program product of claim 1, wherein the plurality of network addresses are accessed from the client computer in response to authenticating the client computer.

3. The computer program product of claim 1, wherein the domain name text record comprises a domain name service (DNS) text record, and wherein the DNS text record includes a domain name of an authenticator the client computer uses to communicate with the authenticator to authenticate the client computer and a network address of the server.

4. The computer program product of claim 1, wherein the operations further comprise:

establishing a connection with the client computer in response to the client computer communicating using a network address of the authenticator provided to the client computer in response to the client computer requesting the domain name text record for the server.

5. The computer program product of claim 4, wherein the operations further comprise:

sending to the client computer a network address of the server for the client computer to use to communicate with the server in response to authenticating the client computer.

6. The computer program product of claim 1, wherein the plurality of network addresses used to identify the client computer comprise a first network address assigned by the client computer, a second network address assigned by an Internet Service Provider for the client computer, and a third network address provided to optimize communications with the server.

7. The computer program product of claim 1, wherein the forwarding the plurality of network addresses comprises providing the plurality of network addresses to identify the client computer to a firewall in response to authenticating the client computer to permit the client computer access to the server.

8. The computer program product of claim 1, wherein the out-of-band authentication parameters from the client computer include a certificate for the client computer used to authenticate the client computer.

9. A system for authenticating a client computer with a server over a network, comprising:

a processor; and a computer readable storage medium in an authenticator having computer readable program code embodied therein that when executed by the processor causes operations, the operations comprising:

receiving, from the client computer, an authentication request to authenticate the client computer with the server, wherein the authentication request includes out-of-band authentication parameters from a domain name text record for the server the client computer obtained from a domain server, including an authentication type indicating how the client computer is authenticated and a domain name of the authenticator to authenticate the client computer;

using the out-of-band authentication parameters from the client computer to authenticate the client computer with an authentication service to access the server;

receiving a plurality of network addresses used to identify the client computer in the network;

in response to authenticating the client computer from the out-of-band authentication parameters, forwarding the plurality of network addresses used to identify the client computer to indicate in an access list for the server to allow the client computer to access the server; and send a message to the client computer indicating access to the server allowed.

10. The system of claim 9, wherein the plurality of network addresses are accessed from the client computer in response to authenticating the client computer.

11. The system of claim 9, wherein the domain name text record comprises a domain name service (DNS) text record, and wherein the DNS text record includes a domain name of an authenticator the client computer uses to communicate with the authenticator to authenticate the client computer and a network address of the server.

12. The system of claim 9, wherein the operations further comprise:

establishing a connection with the client computer in response to the client computer communicating using a network address of the authenticator provided to the client computer in response to the client computer requesting the domain name text record for the server.

13. The system of claim 12, wherein the operations further comprise:

sending to the client computer a network address of the server for the client computer to use to communicate with the server in response to authenticating the client computer.

14. The system of claim 9, wherein the forwarding the plurality of network addresses comprises providing the plurality of network addresses to identify the client computer to a firewall in response to authenticating the client computer to permit the client computer access to the server.

15. A computer implemented method implemented in an authenticator for authenticating a client computer with a server over a network, comprising:

receiving, from the client computer, an authentication request to authenticate the client computer with the server, wherein the authentication request includes out-of-band authentication parameters from a domain name text record for the server the client computer obtained from a domain server, including an authentication type indicating how the client computer is authenticated and a domain name of the authenticator to authenticate the client computer;

using the out-of-band authentication parameters to authenticate the client computer with an authentication service to access the server;

receiving a plurality of network addresses used to identify the client computer in the network;

in response to authenticating the client computer from the out-of-band authentication parameters, forwarding the plurality of network addresses used to identify the client computer to an access list for the server to allow the client computer to access the server; and send a message to the client computer indicating access to the server allowed.

16. The method of claim 15, wherein the plurality of network addresses are accessed from the client computer in response to authenticating the client computer.

17. The method of claim 15, wherein the domain name text record comprises a domain name service (DNS) text record, and wherein the DNS text record includes a domain name of an authenticator the client computer uses to communicate with the authenticator to authenticate the client computer and a network address of the server.

18. The method of claim 15, further comprising:

establishing a connection with the client computer in response to the client computer communicating using a network address of the authenticator provided to the client computer in response to the client computer requesting the domain name text record for the server.

19. The method of claim 16, further comprising:

sending to the client computer a network address of the server for the client computer to use to communicate with the server in response to authenticating the client computer.

20. The method of claim 15, wherein the forwarding the plurality of network addresses comprises providing the plurality of network addresses to identify the client computer to a firewall in response to authenticating the client computer to permit the client computer access to the server.

* * * * *